(12) United States Patent
Wallace

(10) Patent No.: US 6,371,706 B1
(45) Date of Patent: Apr. 16, 2002

(54) HAMMER-IN EXPANSION FASTENER

(75) Inventor: Thomas Campbell Wallace, Glasgow (GB)

(73) Assignee: The Rawlplug Company Limited, Mariner (GB)

( * ) Notice: Subject to any disclaimer, the term of this patent is extended or adjusted under 35 U.S.C. 154(b) by 0 days.

(21) Appl. No.: 09/463,404

(22) PCT Filed: Jul. 31, 1998

(86) PCT No.: PCT/GB98/02163

§ 371 Date: Mar. 22, 2000

§ 102(e) Date: Mar. 22, 2000

(87) PCT Pub. No.: WO99/06717

PCT Pub. Date: Feb. 11, 1999

(30) Foreign Application Priority Data

Aug. 1, 1997 (GB) ............................................. 9716171
Sep. 27, 1997 (GB) ............................................. 9720520

(51) Int. Cl.⁷ ........................... F16B 13/04; F16B 21/00
(52) U.S. Cl. ..................... 411/30; 411/344; 411/489
(58) Field of Search ........................... 411/30, 31, 340, 411/344, 479, 489, 922

(56) References Cited

U.S. PATENT DOCUMENTS

| 490,613 | A | * | 1/1893 | Miner ........................ 411/489 |
| 4,354,782 | A | * | 10/1982 | Newport ................. 411/479 X |
| 4,902,179 | A | * | 2/1990 | Harker ..................... 411/30 X |
| 5,037,257 | A | * | 8/1991 | Kubic et al. .................. 411/30 |

* cited by examiner

Primary Examiner—Neill Wilson
(74) Attorney, Agent, or Firm—Jacobson Holman, PLLC

(57) ABSTRACT

A hammer-in expansion fastener for embedding into a wall and receiving a screw having an elongated body which is provided with two opposite ends and a bore extending into it from one end to receive a screw. The other end of the body is tapered inwardly to a leading end of the body to an extent allowing the wall plug to be driven into a wall of building material. The other end is further provided with a non-uniform taper of:

(a) between 12° to 18° to the longitudinal axis of the body at the leading end and about 10 mm in length measured along the longitudinal axis; and (b) from 4° to 8° to the longitudinal axis of the body at a portion remote from the leading end.

9 Claims, 2 Drawing Sheets

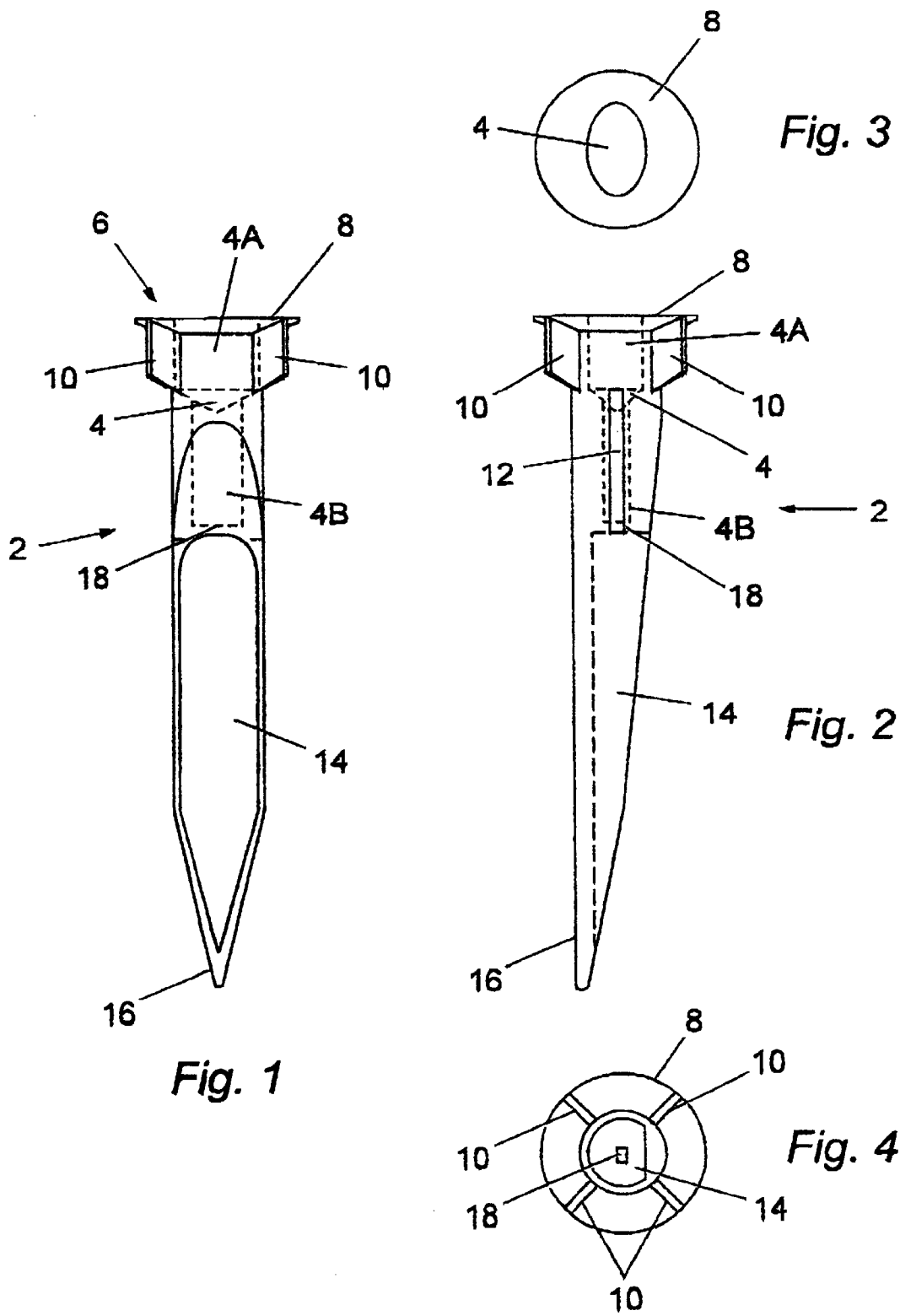

HAMMER-IN EXPANSION FASTENER

BACKGROUND OF THE INVENTION

1. Field of the Invention

This invention relates to a hammer-in expansion fastener.

2. Description of Related Art

Traditionally, expansion fasteners have been used for securing items to walls, the fastener providing a resilient lining for a bore in the wall, into which a screw is driven to secure an item to the wall. The bore has generally been pre-drilled and the fastener then pushed into it.

Expansion fasteners have been proposed which are hammered directly into the wall without the need for pre-drilling, and this can provide a more convenient means of securing an item to the wall. However, when used in plasterboard or other friable substrate such hammer-in expansion fasteners can have the effect of disintegrating the substrate at its far side, thereby reducing the depth of effective contact between the expansion fastener and the wall.

It has been proposed to provide a hammer-in expansion fastener having a tapered leading end, and such a product has reduced the extent of disintegration of the substrate. However, the taper is at a shallow angle with the result that the expansion fastener is of considerable length, and this can cause it to interfere with cables and other items beyond the far side of the wall.

BRIEF SUMMARY OF THE INVENTION

According to the present invention there is provided a hammer-in expansion fastener having an elongate body which has two opposite ends, a longitudinal axis and a bore extending into it from one end to receive a screw, the other end of the body tapering inwardly to a leading end of the body to an extent allowing the hammer-in expansion fastener to be driven into a wall of building material, the said other end of the body having a non-uniform taper of (a) between 12° to 18° to the longitudinal axis of the body at the leading end and about 10 mm in length measured along the longitudinal axis and (b) from 4° to 8° to the longitudinal axis of the body at a portion remote from the leading end.

Preferably, the other end of the body is an angularly truncated tube, said truncation defining said non-uniform taper.

Preferably also, the mouth of the bore at said one end has a lateral surface extending outwardly around it to limit the extent of penetration of the hammer-in expansion fastener into the wall. The surface also provides means for spreading the load of a hammer or other driving tool when applied to the hammer-in expansion fastener.

It is further preferable for the bore to be provided with an internal partition wall which closes said bore and separates it into two distinct portions. The partition wall is made of a material (like plastic) which can be ruptured by the introduction of a screw inside the bore. The partition wall prevents disintegrated material from the wall entering the bore when the hammer-in expansion fastener is positioned into the wall. The bore may be circular in cross-section, but may advantageously be non-circular, for example oval.

Anti-rotation fins may be provided at intervals around said one end of the body projecting externally from the body so that rotation of a screw into the bore does not result in rotation of the hammer-in expansion fastener in the wall.

At least one aperture, for example slots, may be provided through the side wall of said one end of the body to allow effective radial expansion of that portion of the hammer-in expansion fastener. The at least one aperture preferably extends along the body and generally parallel to the longitudinal axis. It is also preferred that such slots extend along the body to the depth of the wall of building material.

Further according to the invention there is provided a hammer-in expansion fastener having an elongate body which has two opposite ends, a longitudinal axis and a bore extending into it from one end to receive a screw, the other end of the body having a longitudinally recessed portion which tapers inwardly in a non-uniform manner to a leading end of the body to an extent allowing the hammer-in expansion fastener to be driven into a wall of building material, the said other end being flexible to the extent that the non-uniformity of the taper of the recessed portion causes it to deflect outwardly from the longitudinal axis of the body on insertion into said wall.

Further according to the invention there is provided a hole-forming tool having an elongate body which has a longitudinal axis and that tapers inwardly to a leading end to an extent allowing it to be driven into a wall of material, the taper being (a) between 12° and 18° to the longitudinal axis of the body at its leading end and about 10 mm in length measured along the longitudinal axis and (b) from 4° to 8° to the longitudinal axis of the body at a portion remote from the leading end.

Preferably the said other end of the body is an angularly truncated tube, and said other end defines a longitudinally-extending recess which has a non-uniform taper towards the leading end. Preferably the non-uniform taper has a first portion adjacent the leading end of from 12° to 18°, and a second portion remote from the leading end of from 4° to 8°, measured from the longitudinal axis of the body.

BRIEF DESCRIPTION OF THE DRAWINGS

An embodiment of this invention will now be described by way of example with reference to the accompanying drawing in which:

FIG. 1 is a front view of a hammer-in expansion fastener of this invention;

FIG. 2 is a side view of the hammer-in expansion fastener of FIG. 1;

FIGS. 3 and 4 are respectively top and bottom views of the hammer-in expansion fastener of FIG. 1.

DETAILED DESCRIPTION OF THE INVENTION

Figure 5:
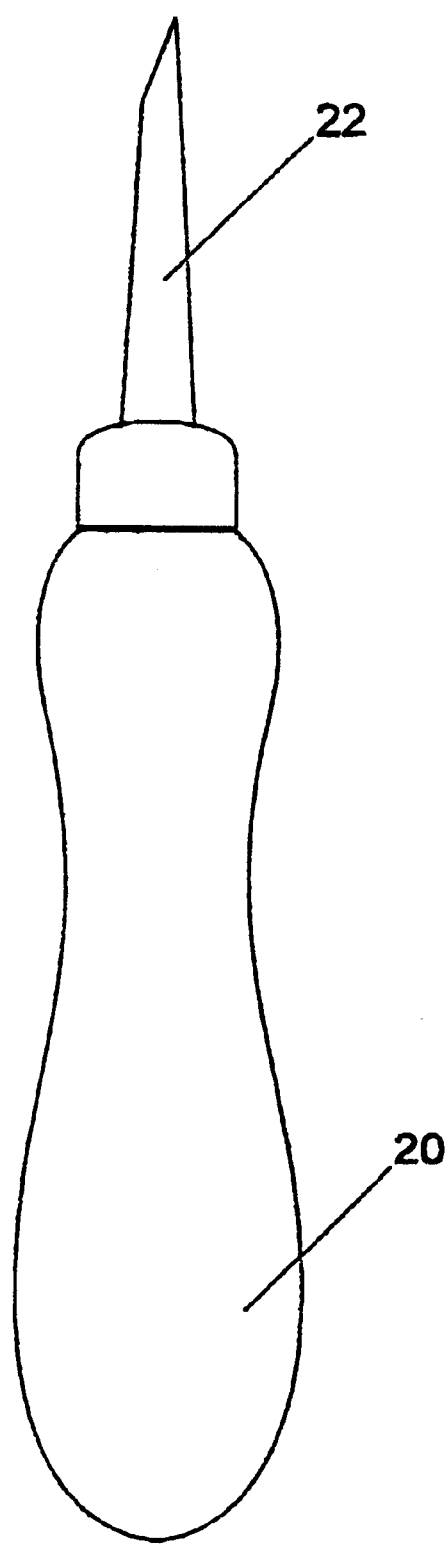
FIG. 5 is a side view of a hole-forming tool of this invention.

As shown in FIGS. 1 and 2 the hammer-in expansion fastener of this embodiment of the invention has a generally cylindrical body indicated at 2 of glass-reinforced nylon and formed with a bore 4 extending partially along it from one end 6. The upper portion of the bore 4A is wider than a lower portion 4B. The bore 4 is oval in section as shown in FIG. 3 and its opening is surrounded by a circular surface 8 which provides a limit-stop to penetration of the expansion fastener into building material, as well as providing a striking surface for a hammer or the like. Below the surface 8 are four radially outwardly-extending fins 10 equally spaced around the body for resisting rotation of the expansion fastener once installed in building material.

Towards said one end 6 are two diametrically-opposed longitudinally-directed slots 12 (see FIG. 2) which extend from the end of the fins 10 to a distance of around 13 mm from the surface 8.

Level with the end of the slots 12 is a recess 14 in the body provided by omission of a part of its wall to provide a scalloped effect. The side edges of the recess 14 provide a taper of around 6° along the body with reference to its longitudinal axis, commencing adjacent the lower extremity of the fins 10 and terminating about 10 mm from the lower, or leading end of the body, towards which the side edges of the recess 14 then taper at an angle of 14°.

The bore 4 terminates at its lower end just above the upper end of the recess 14, a partition wall or a web 18 of the material extending across the body to prevent entry of detritus from the recess 14 into the bore 4.

The expansion fastener is used to secure items such as coat hooks, toilet roll holders, mirrors and the like to walls and may be inserted into solid material such as aerated blockwork or into friable material such as plasterboard.

The expansion fastener is driven into the wall by striking the surface 8 with a hammer so that the leading end 16 penetrates the wall until the underside of the surface 8 engages the surface of the wall. When the wall is of solid material the shape of the tapered portions of the body 2 causes the leading end 16 to be forced laterally so that the tapered portions enter the wall along a curved path. This is less noticeable in plasterboard.

When the expansion fastener has been fully inserted, a screw is passed through the item to be fixed, into the bore 4. The screw is driven in through the web 18 and until fully inserted. The bore 4 is slightly smaller in diameter than the diameter of the screw thread. Thus when the screw is driven into the bore 4, the bore 4 deforms under the action of the driving torque. The screw is therefore retained in the bore 4 in common with prior art fixings.

The insertion of the screw causes the portion of the body 2 between the surface 8 and the recess 14 to expand radially outwards against the material of the wall, thereby to provide frictional engagement between the expansion fastener and the wall so as to resist withdrawal; this radial expansion is eased and enhanced by the provision of the slots 12.

As the screw is driven into the bore 4 it breaks through the web 18 into the recess 14, and passes straight on. This provides a "forked" arrangement, one prong of the fork consisting of the leading end of the screw and the other prong consisting of the now-curved recessed portion 14 of the body. This forked arrangement farther resists withdrawal of the expansion fastener and screw from the wall.

A further advantage of this embodiment of the invention is that the 14° taper at the leading end of the body 2 allows the overall length of the body to be kept to a reasonable limit, so as not to penetrate beyond the inner face of a plasterboard wall to an extent that it fouls and interferes with cables and the like in an inter-wall cavity, nor to engage with an inner face of an opposed wall across such a cavity. The 14° taper also provides strength to the leading end of the body which allows it to penetrate aerated blockwork and the like.

Referring now to FIG. 5, the hole-forming tool of this embodiment of the invention has a handle 20 from which extends a rigid (for example steel or aluminum) shaft 22 whose general form is the same as the tapered portion of the body 2 of the expansion fastener of FIGS. 1 to 4, in respect of its taper angles and the presence of a recess 14 (not shown in FIG. 5).

The hole forming tool can be used as an awl for creating a hole through material such as plasterboard and aerated blockwork, where the form of the shaft 22 has similar advantages on insertion to those of the leading end of the body 2 of the fixing of FIGS. 1 to 4.

What is claimed is:

1. A hammer-in expansion fastener having an elongate body which has two opposite ends, said body having a longitudinal axis and a bore extending into it from one end to receive a screw, the other end of the body being tapered inwardly to a leading end of the body to an extent allowing the hammer-in expansion fastener to be driven into a wall of building material, said other end having a non-uniform taper of:

(a) between 12° to 18° to the longitudinal axis of the body at the leading end and about 10 mm in length measured along the longitudinal axis; and (b) from 4° to 8° to the longitudinal axis of the body at a portion remote from the leading end.

2. A hammer-in expansion fastener as claimed in claim 1, wherein said other end of the body is an angularly truncated tube, said truncation defining said non-uniform taper.

3. A hammer-in expansion fastener as claimed in claim 1, wherein the bore is provided with a mouth at said one end which has a lateral surface extending outwardly around it to limit the extent of penetration of the hammer-in expansion fastener expansion fastener into a wall.

4. A hammer-in expansion fastener as claimed in claim 1, wherein a partition wall is provided inside the bore to close said bore and separates it into two distinct portions, said partition wall being made of a material which can be ruptured by the introduction of a screw inside the bore.

5. A hammer-in expansion fastener as claimed in claim 1, wherein the bore is oval in cross-section.

6. A hammer-in expansion fastener as claimed in claim 1, wherein anti-rotation fins are provided at intervals around said one end of the body, said fins projecting externally from said body.

7. A hammer-in expansion fastener as claimed in claim 1, wherein at least one aperture is provided through the side wall of the one end of the body.

8. A hammer-in expansion fastener as claimed in claim 7, wherein the aperture extends along the body generally parallel to the longitudinal axis of the body.

9. A hammer-in expansion fastener as claimed in claim 1, wherein said other end of the body is flexible to the extent that the taper of the recessed portion causes it to deflect outwardly from the longitudinal axis of the body on insertion into said wall.

* * * * *